Feb. 2, 1926.
E. F. SMITH
1,571,559
MILLING CUTTER AND PROCESS OF MAKING SAME
Filed July 2, 1923
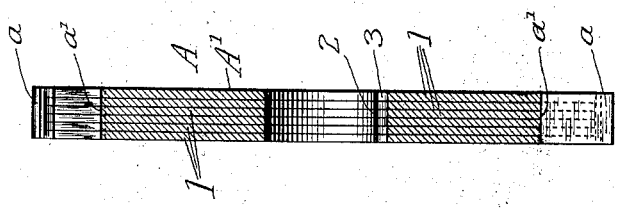
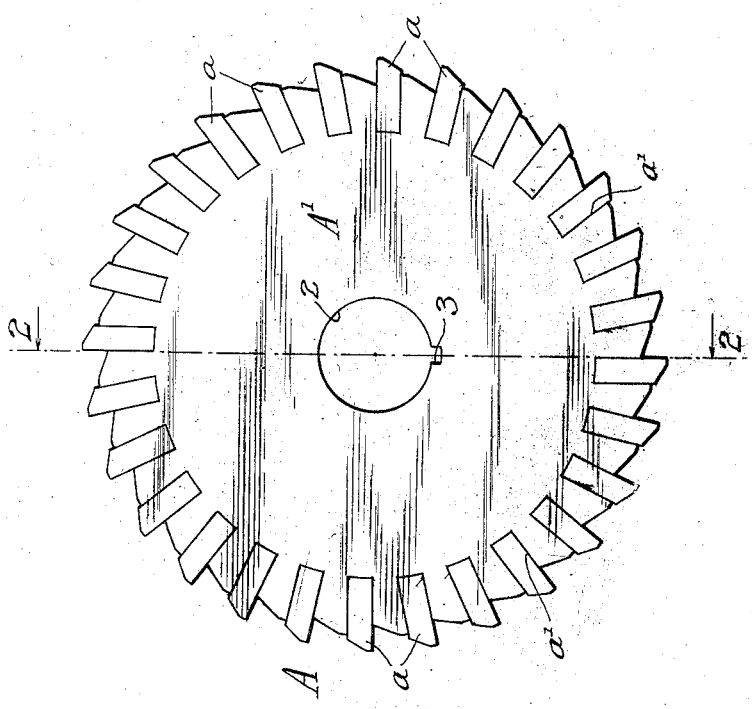
Witness
Martin H. Olsen.
Inventor
Edward F. Smith
By Geo. E. Waldo,
Atty.

Patented Feb. 2, 1926.

1,571,559

UNITED STATES PATENT OFFICE.

EDWARD F. SMITH, OF CHICAGO, ILLINOIS.

MILLING CUTTER AND PROCESS OF MAKING SAME.

Application filed July 2, 1923. Serial No. 649,048.

*To all whom it may concern:*

Be it known that I, EDWARD F. SMITH, a citizen of the United States, and a resident of Chicago, in the county of Cook and State of Illinois, have invented an Improved Milling Cutter and Process of Making Same, of which the following is a specification.

This invention relates to milling cutters and to an improved process of making the same, with particular reference to milling cutters having inset teeth.

As is generally well known to persons skilled in the art, milling cutters having inset teeth, particularly teeth of high speed metal, are extensively used at the present time, the body portions of the cutters being made from solid pieces or blanks of mild steel and the cutting teeth being secured in marginal slots formed therein, usually by means of a milling cutter. This process of manufacture involves a relatively large amount of work and renders the cost of manufacture of such cutters produced in the manner described correspondingly high.

The object of my invention is to provide a milling cutter having inset teeth, which is of new and novel construction, and also to provide an improved process of making the same, whereby such cutters may be manufactured at relatively small cost as compared with milling cutters now in common use, produced in accordance with present practice.

As my invention relates to improvements in cutters per se, I attain the object of the invention by making the body portions of the cutters of laminated construction, the laminæ from which the body portion of the cutter is formed consisting of sheet metal blanks, preferably sheet steel, which may be stamped at very slight expense in a punch press, each of said blanks being provided with a central hole, corresponding to the bores of the finished cutters which are adapted to receive the arbors for mounting said cutters, key-ways, and marginal notches, corresponding to the slots in the body portions of the cutters in which the cutting teeth are secured. A number of said blanks sufficient to form a cutter body of desired thickness are then assembled with the central holes, key-ways and marginal notches thereof in register with each other, separate cutter teeth inserted into the marginal slots formed by the registering notches in said blanks and said blanks and cutting teeth then brazed together to form a substantially integral structure. The cutter having been thus formed, is finished and ground in the usual manner.

In practice, the blanks forming the cutter bodies may conveniently be assembled and the cutting teeth inserted by means of a suitably contrived jig, though I do not desire to limit myself as regards the means employed for this purpose.

As my invention relates to an improved process of manufacture, the blanks forming the body portion of the cutter are initially secured together, which may conveniently be done by spot welding, the cutting teeth are then inserted into and secured in the marginal slots in said body portion and the entire cutter, thus assembled is brazed together, preferably by immersing it into a bath of molten brazing compound, in which it is permitted to remain for a sufficient length of time to permit the molten brazing compound to flow between adjacent blanks forming the body of the cutter, whereupon the cutter may be withdrawn from the brazing compound and superfluous brazing compound removed—which may be done effectively and economically by rotating the cutter at high speed—after which the cutter may be finished in a grinding machine in accordance with usual practice.

In accordance with my invention, the cutting teeth may be temporarily secured in the slots in the body portion of the cutter by crimping or swaging the edges of the slots in said body portion firmly into engagement with the sides of said cutting teeth.

In accordance with my invention, as it relates to an improved process of manufacture, also, the cutting teeth, when made of metal which requires to be hardened and tempered, as carbon or high speed steel, preferably will be pre-hardened before they are secured in the slots in the body portion of the cutter and the brazing operation whereby the different elements of the cutter are permanently secured together, is effected in a bath of molten brazing compound, the effective brazing temperature of which is substantially the same as the temperature at which the cutting teeth are to be drawn to impart a desired temper thereto, said cutters being permitted to remain in said bath until all parts thereof are heated to the temperature of the molten compound. Said cutters are then withdrawn, superfluous compound removed and are cooled either by immersion in water, by means of an air blast or in any other suitable manner.

In the accompanying drawing in which my invention is fully illustrated,

Figure 1 is a side view of a cutter embodying my invention and improvements and which may be constructed in accordance with my improved process; and Figure 2 is a sectional view thereof on the line 2—2 of Fig. 1.

Referring now to the drawings, A designates the cutter as a whole, A' the body portion thereof, a cutting teeth secured in marginal notches a' formed in said body portion, said cutter being provided with a usual hole at its center adapted to receive an arbor on which the cutter will be mounted in use, and with a key-way adapted to receive a key to prevent turning of the cutter on the arbor, in operation.

In accordance with my invention as it relates to improvements in milling cutters per se, the body portion A' of the cutter is of laminated construction, consisting of blanks 1 of suitable sheet metal, preferably sheet steel, which can be produced at very small cost by stamping them, complete with marginal notches a', hole 2 and key-way 3, from sheet metal plates of suitable guage, which will usually vary with the diameter and number of the blanks 1—that is with the size of the finished cutter. My invention, however, contemplates forming the blanks 1 in any desired or approved manner.

The blanks 1 having been formed, a sufficient number of them to make a cutter of desired width are assembled with the holes 2, notches a' and key-ways 3, of different blanks in register with each other, the cutting teeth a then are inserted into the slots formed by the registering notches a' and the constituent elements of the cutter are then rigidly secured together to form a substantially integral or unitary structure, which may conveniently be effected by means of usual brazing processes.

The constituent elements of the cutter having been secured together, the cutter is ready for the finishing operations which may be done in accordance with any usual practice, consisting preferably in grinding the bore 2 to proper size, grinding the teeth a to sharpen the same and to render their cutting edges concentric with the bore 2 and in grinding the sides of the cutter to relieve the same to provide necessary clearance so that the cutter will not bind in use.

As my invention relates to an improved process of manufacture, the blanks 1, having been formed, are first subjected to an acid bath, which will cleanse the surfaces thereof, removing therefrom all oil and grease, and which is preferably continued for a sufficient length of time so that it will remove the oxidized scale from the surface of said blanks. The blanks having been removed from said cleansing bath, are next plated with copper, zinc or other metal which will have a strong affinity for a brazing compound or alloy, after which a number of blanks sufficient to form a cutter of desired width or thickness are assembled with the holes 2, key-ways 3 and marginal notches a' in register with each other, in which relation they are initially secured together by suitable means, simple means for the purpose consisting in subjecting the assembled blanks to a spot-welding operation, whereby the contacting sides of said blanks will be welded together, thus forming the body portion A' of the cutter. The cutting teeth a having been first plated with copper, zinc or other metal, are then inserted into the marginal slots formed by the notches 1 and are secured therein by any suitable holding means, as by crimping or swaging the edges of said slots into firm contact or engagement with the sides of the teeth.

The cutting teeth a having been thus secured to the body portion of the cutter, the different elements of the cutter are then brazed together to form a unitary or integral structure. In accordance with what I now consider preferable means for brazing the constituent elements of the cutter together, the cutter is immersed in a bath of molten brazing compound or alloy and is permitted to remain in said bath a sufficient length of time to permit the brazing compound to flow into the interstices between different parts of the cutter after which the cutter is withdrawn from the bath, superfluous brazing compound removed—which may conveniently be effected by rotating said cutter at a high speed—and said cutter permitted to cool.

In accordance with the preferable practice of my improved process, also, the cutting teeth a, when made of metal which requires to be hardened and tempered, as carbon or high speed steel, will be hardened before they are inserted into the slots in the body portion A' of the cutter and brazing is effected by means of a brazing compound the temperature of which is substantially the same as the temperature to which the cutting teeth are to be drawn to impart a desired temper thereto, the cutter being permitted to remain in the bath of molten brazing compound a sufficient length of time so that the cutting teeth will be heated throughout to the temperature of said bath. When this temperature is attained, the cutter is withdrawn from the bath, superfluous brazing metal removed therefrom and the cutter subjected to a cooling process, either by immersing it in water or subjecting it to the action of an air blast or otherwise, after which the cutter is finished in any usual manner.

Instead of arranging the cutting teeth *a* parallel with the axes of the cutter, as shown, my invention contemplates equally arranging them on a spiral or at an angle to the cutter axis. This arrangement involves no departure from my invention, as in view of the disclosure of the specification and drawings, skilled mechanics can readily produce such cutters without the exercise of invention.

I claim—

1. A milling cutter comprising a body portion consisting of a plurality of sheet metal blanks initially formed with marginal notches and secured together with the notches of different blanks in register with each other to form slots, and cutting teeth secured in said slots, the constituent elements of said cutter being brazed together to form a rigid, unitary structure.

2. The process of manufacturing milling cutters of the type specified, which consists in forming a plurality of sheet metal blanks provided with marginal notches, assembling a number of said blanks to form a cutter body of desired thickness with the marginal notches, respectively, in register with each other, inserting separate cutting teeth into the slots formed by the registering notches in said blanks, and in them brazing the constituent elements of said cutter to form a rigid, unitary structure by immersing the same in a bath of molten brazing compound.

3. The process of manufacturing milling cutters of the type and as specified in claim 2, in which the cutting teeth are prehardened and the constituent elements of the cutter are brazed together by immersing them in a bath of molten brazing compound the temperature of which is substantially the same as the temperature to which the cutting teeth are to be drawn to impart a desired temper thereto, and the cutter is permitted to remain in the molten brazing compound until the cutting teeth thereof are heated throughout to the temperature of said compound, and is then withdrawn and cooled suddenly.

4. The process of manufacturing milling cutters of the type specified, which consists in forming a plurality of sheet metal blanks provided with central holes and marginal notches, assembling a number of said blanks to form a cutter body of desired thickness with the central holes and marginal notches thereof, respectively, in register with each other, initially spot welding said blanks together in asembled position, inserting and securing the cutting teeth in the slots formed by the registering notches in said blanks, and in then brazing the constituent elements of said cutter together to form a rigid unitary structure, by immersing them in a bath of molten brazing compound.

In witness that I claim the foregoing as my invention, I affix my signature this 28th day of June, A. D. 1923.

EDWARD F. SMITH.